Aug. 24, 1926.

E. FEIDT ET AL 1,597,028

CLOSURE AND MEANS FOR OPERATING AND CONTROLLING THE SAME

Filed April 22, 1922    7 Sheets-Sheet 1

Witnesses
Harry R. White
W. P. Kilroy

Inventors
Emil Feidt,
William A. Cross,
Wainwright B. Gervais,
Brown Boettcher Dunne Attys.

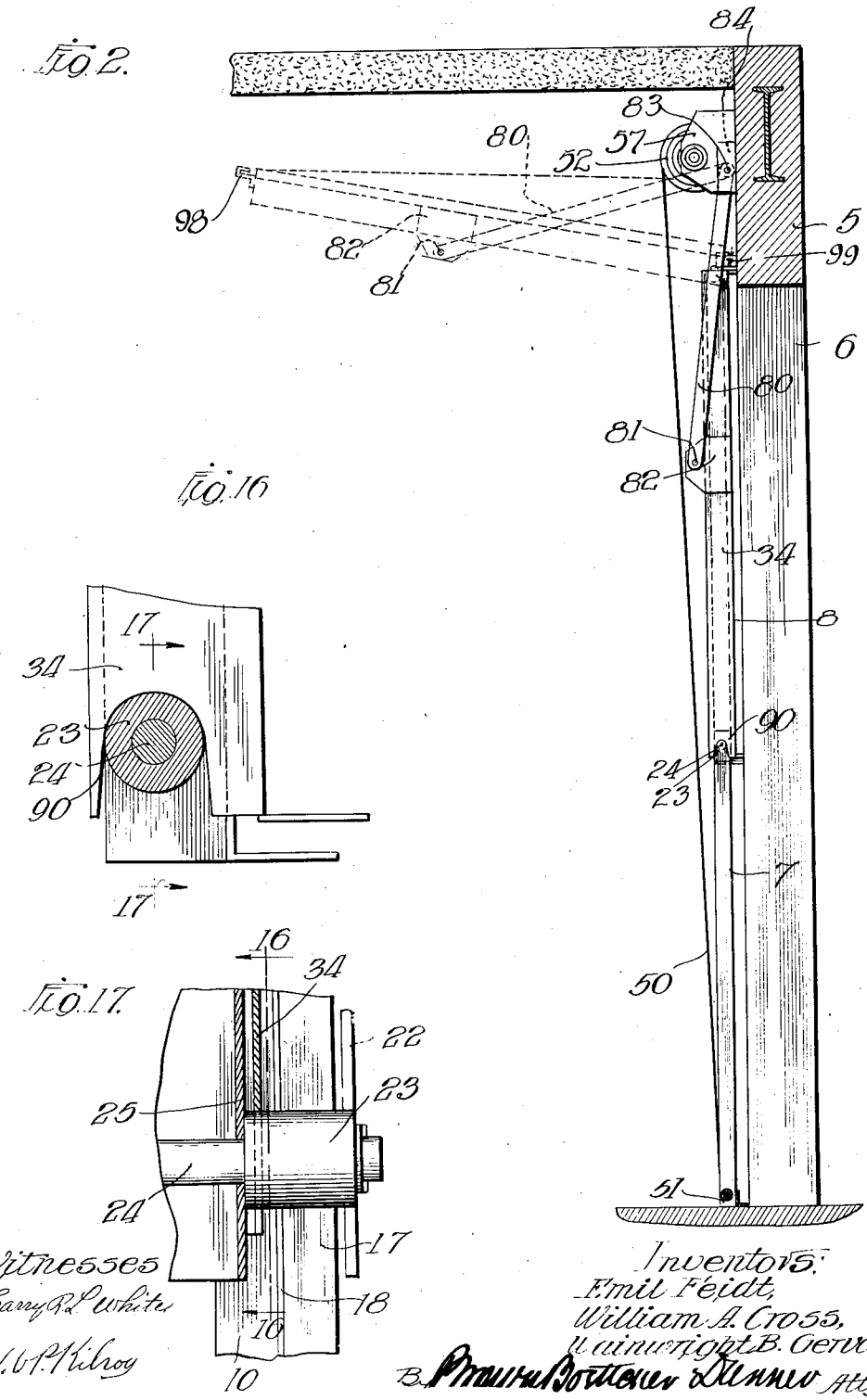

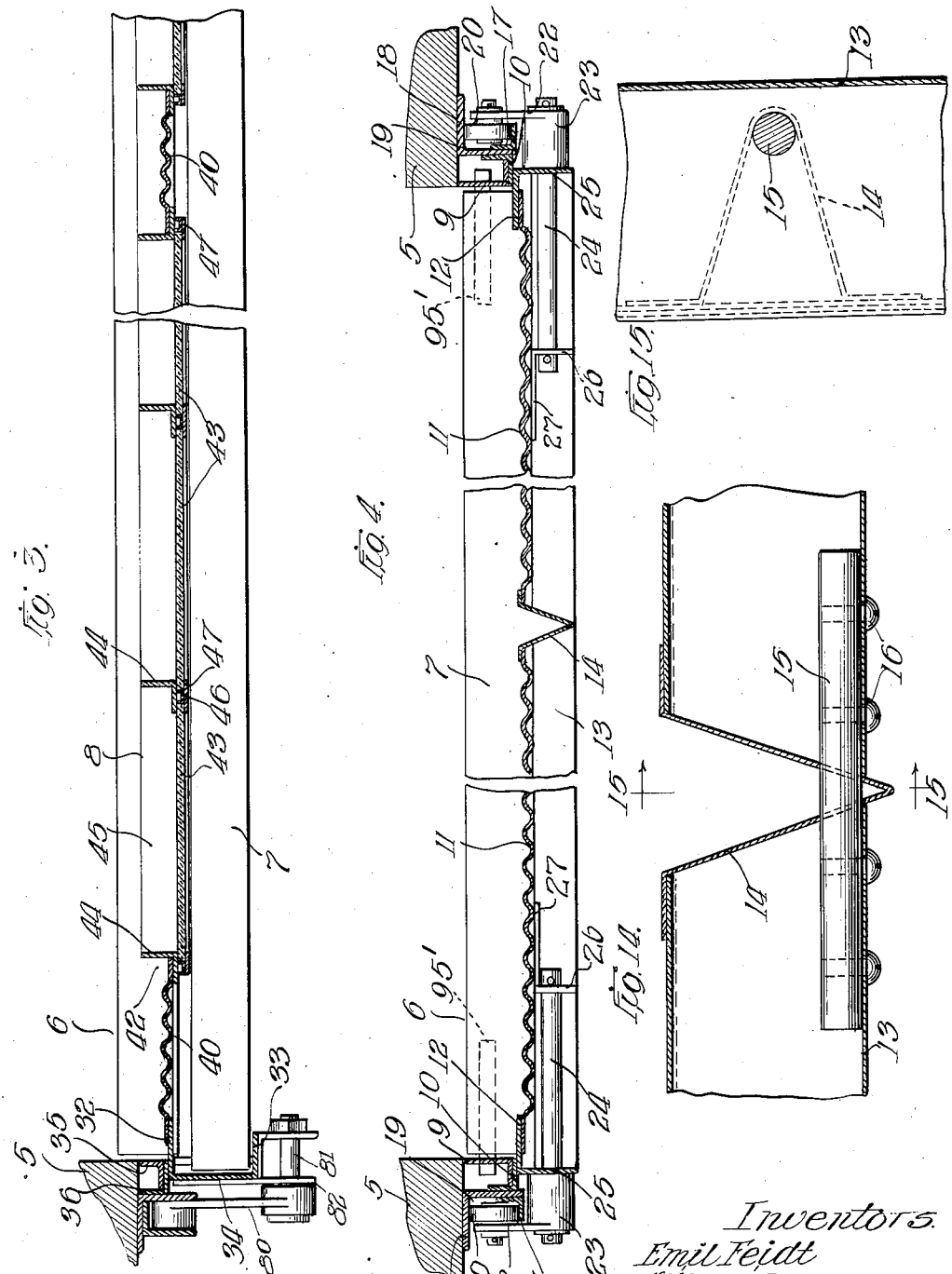

Aug. 24, 1926.  1,597,028
E. FEIDT ET AL
CLOSURE AND MEANS FOR OPERATING AND CONTROLLING THE SAME
Filed April 22, 1922   7 Sheets-Sheet 4
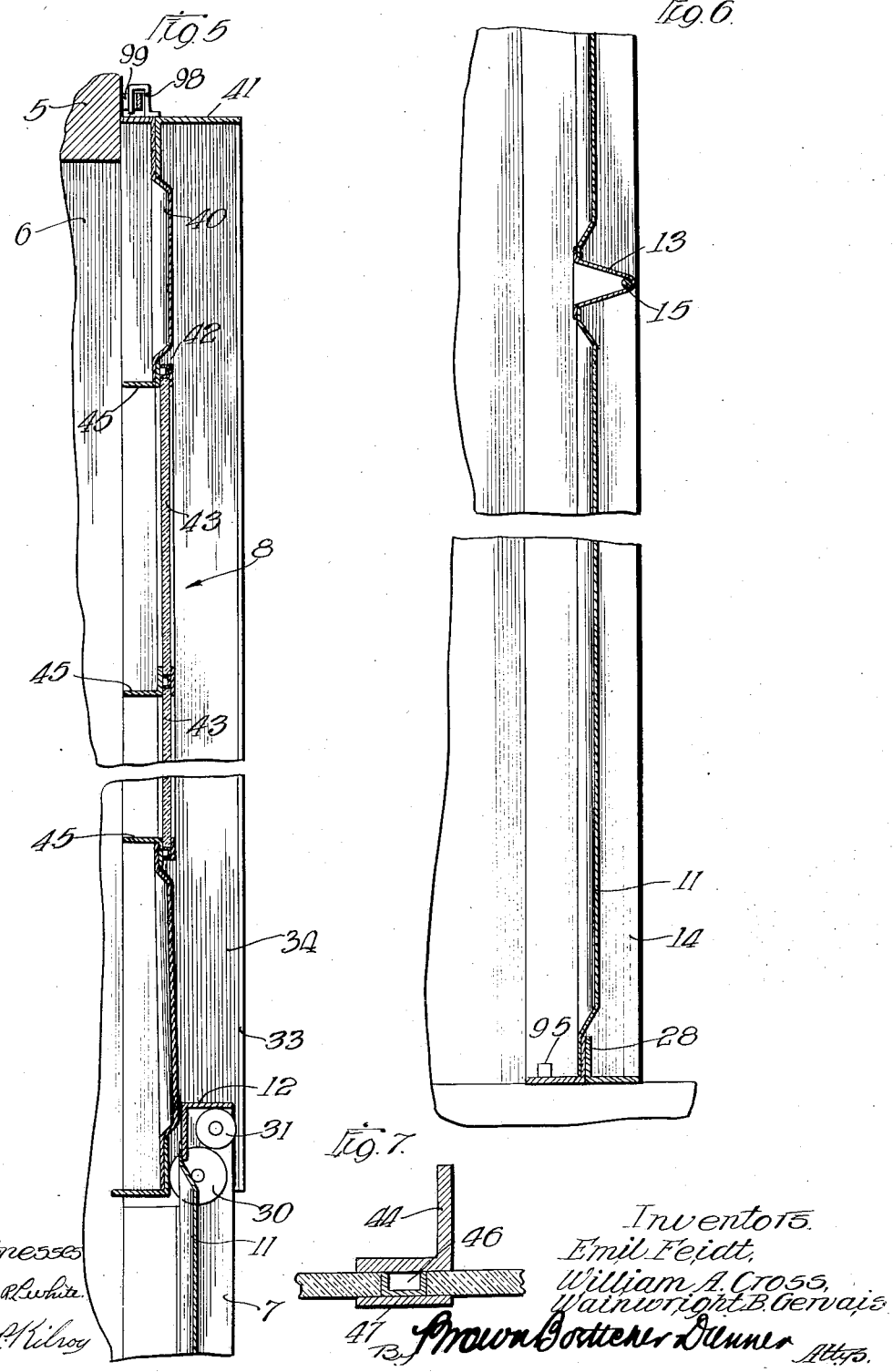

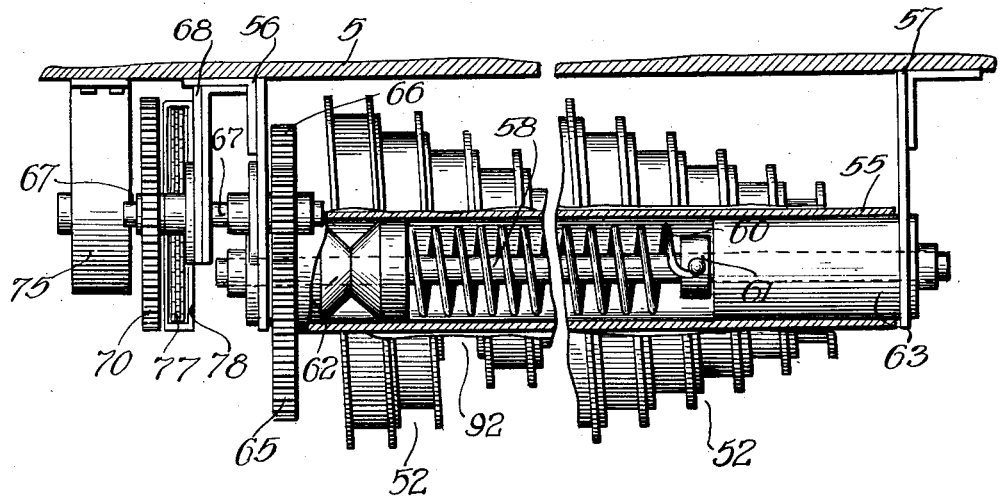
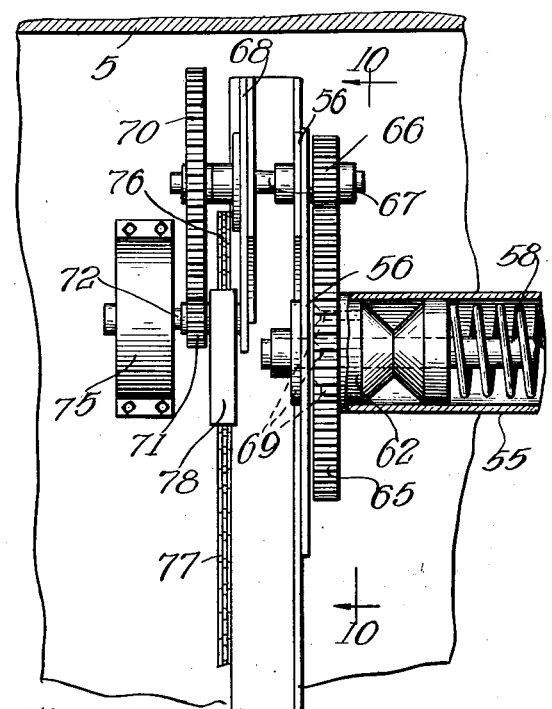
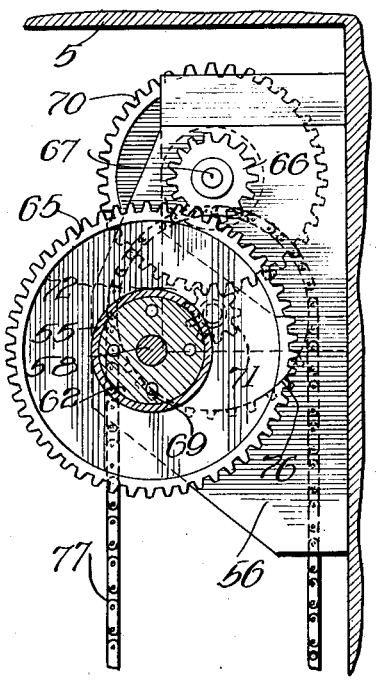

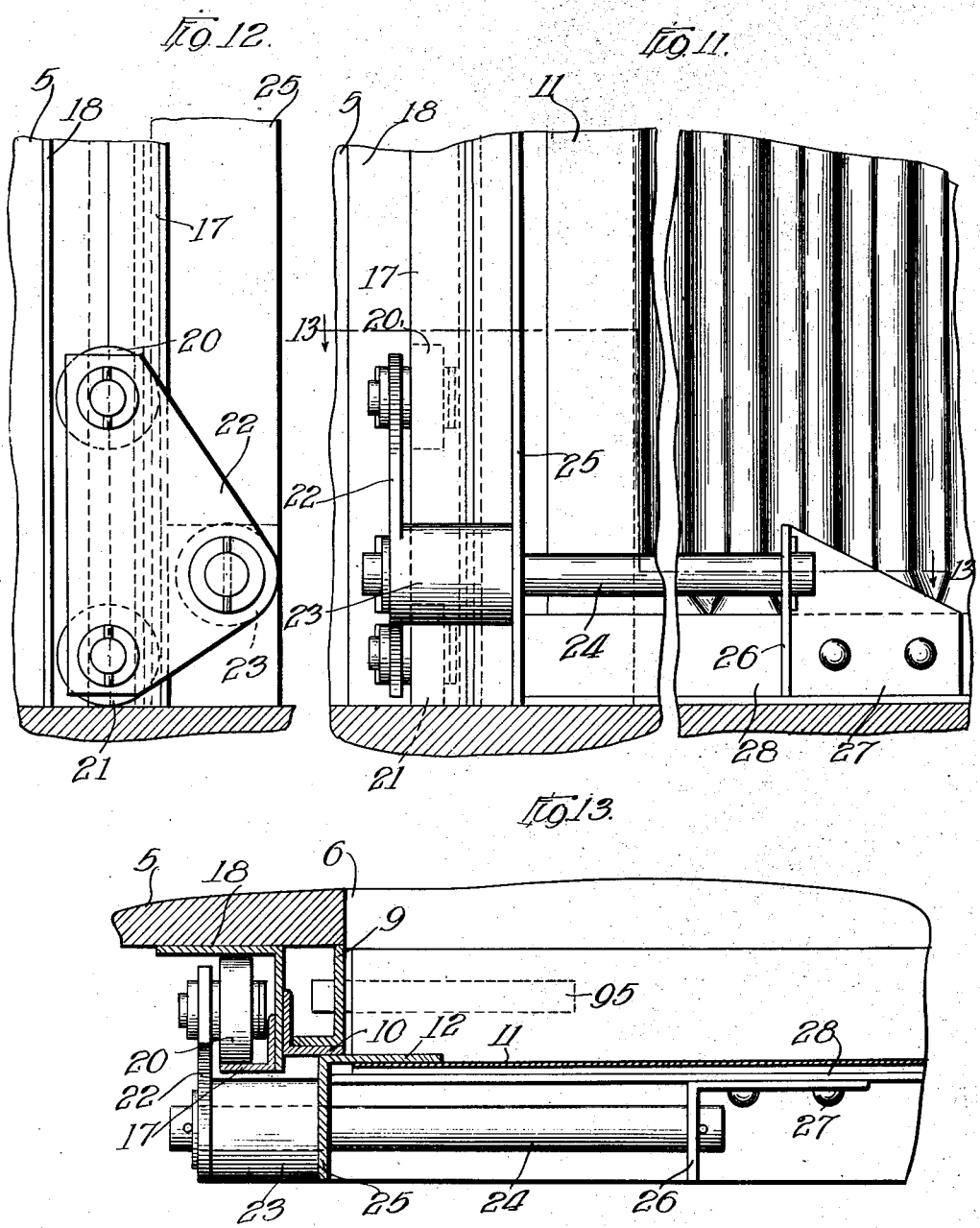

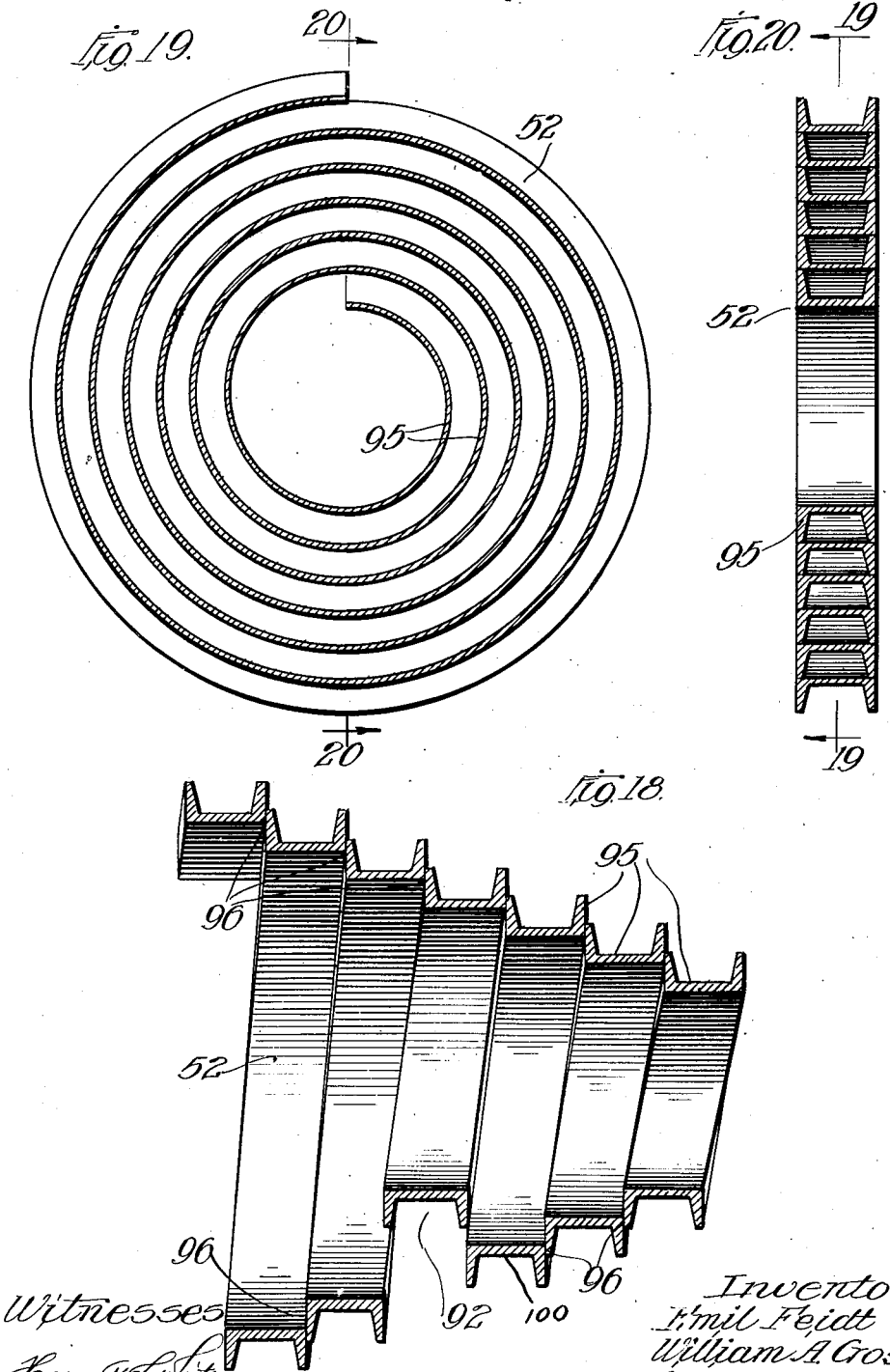

Patented Aug. 24, 1926.

1,597,028

UNITED STATES PATENT OFFICE.

EMIL FEIDT, WILLIAM A. CROSS, AND WAINWRIGHT B. GERVAIS, OF CHICAGO, ILLINOIS, ASSIGNORS TO VARIETY FIRE DOOR CO., OF CHICAGO, ILLINOIS, A CORPORATION OF ILLINOIS.

CLOSURE AND MEANS FOR OPERATING AND CONTROLLING THE SAME.

Application filed April 22, 1922. Serial No. 556,090.

Our invention relates to closures and means for operating and controlling the same, and is concerned particularly with that class of closures commonly employed in freight sheds, steamship docks, warehouses, factories, and the like, where large doorway openings are required.

One object of this invention is to provide a simple and improved sectional door so constructed as to require a minimum operating space, and so controlled as to render the operation thereof exceedingly simple and easy. To these ends, we have provided for mounting and controlling the door sections, so that when the door is in closed position, the door sections will completely cover the door opening and will upon movement into open position first assume a superimposed relation and then be swung away from the vertical to clear the door opening. We not only provide for moving a door of this class with a minimum of effort and for properly balancing the same throughout its various positions, but have entirely dispensed with the counterweighting arrangements of the prior art and the intricate column or guide systems therefor.

Other details and arrangements not hereinbefore set forth and certain constructional features which are novel and important will appear from the following detailed description, and the claims taken with an inspection of the accompanying drawings, in which:—

Figure 2 is a side view taken substantially on the line 2—2 of Figure 1;

Figure 3 is an enlarged horizontal sectional view taken substantially on the line 3—3 of Figure 1;

Figure 4 is an enlarged horizontal sectional view taken substantially on the line 4—4 of Figure 1;

Figure 5 is an enlarged vertical sectional view taken substantially on the line 5—5 of Figure 1;

Figure 6 is an enlarged vertical sectional view taken substantially on the line 6—6 of Figure 1 forming with Figure 5 a complete vertical section through the door;

Figure 7 is a detail horizontal section taken on the line 7—7 of Figure 1;

Figure 8 is an enlarged plan view partially in section and partially broken away of the door operating and controlling mechanism;

Figure 9 is a fragmentary front elevational view of a portion of the same;

Figure 10 is a vertical sectional view taken substantially on the line 10—10 of Figure 9;

Figure 11 is an enlarged fragmentary front elevational view of one of the lower corners of the door;

Figure 12 is a side elevational view of the same;

Figure 13 is a horizontal sectional view taken substantially on the line 13—13 of Figure 11;

Figure 14 is an enlarged fragmentary horizontal sectional view taken on the line 14—14 of Figure 1;

Figure 15 is an enlarged fragmentary vertical sectional view taken on the line 15—15 of Figure 14;

Figure 16 is a detail vertical section taken on the line 16—16 of Figure 17 showing the cooperative engagement by means of which the upper door section is moved by the movement of the lower door section;

Figure 17 is a vertical sectional view taken substantially on the line 17—17 of Figure 16;

Figure 18 is an enlarged vertical sectional view of the spiral channel forming the spiral balancing pulley;

Figure 19 is a vertical sectional view taken on the line 19—19 of Figure 20, showing the coiled or wound channel from which the spiral pulley is formed; and Figure 20 is a vertical sectional view taken on the line 20—20 of Figure 19.

Figure 1:
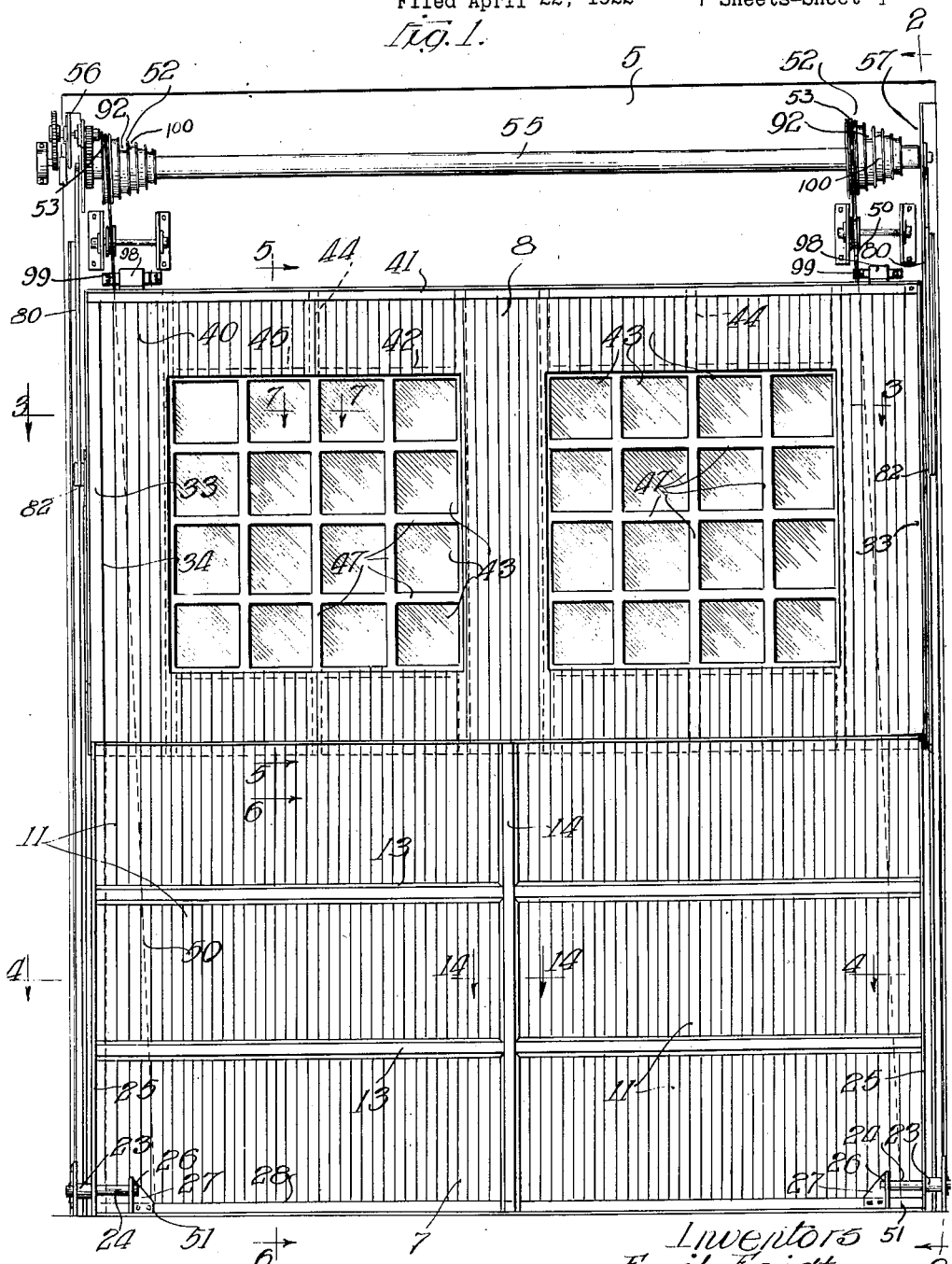
Figure 1 is a front elevational view of a door embodying our present invention.

With reference now to the drawings, the closure of our invention is shown applied to the wall 5 surrounding a doorway 6 therethrough, and is adapted when in closed position to completely cover the opening 6. The closure comprises or is made up of two substantially rectangular sections, a lower section 7 and an upper section 8. The lower section 7 is mounted for vertical sliding movement up into superimposed relation in front (Fig. 1) of the upper section 8, the mounting and association of the door sections 7 and 8 being such that upon further upward movement of the lower section 7 after moving it up into superimposed relation behind the section 8, the upper and lower sections are swung together out away from the vertical to clear the opening 6.

To these ends, suitable cooperating angle irons 9 and 10 (Fig. 4) are arranged vertically along each of the opposite sides of the doorway 6 being secured to the wall 5 in any suitable or preferred manner. The cooperating angle irons 9 and 10 along the opposite sides of the doorway 6 extend vertically through the length of the lower closure section 7, and in addition to maintaining the proper positioning of such section with respect to the wall 5 form runways or guides along which the section 7 is moved upwardly into superimposed relation in front of the upper closure section 8. The particular structural details of the door section per se may, of course, be varied within the scope of the present invention. However, in the present instance, the lower section 7 comprises a plurality of panels 11 preferably corrugated as shown, around the outer edges of which an angle iron 12 defining the section 7 extends. The edges of the panels 11 may be riveted to the marginal member 12, or secured thereto in any other desired manner. Horizontal V irons 13 and a vertical V iron 14 join the adjacent inner edges of the panels 11 and impart a desired stiffness or rigidity to the area of the section 7. The horizontal V irons 13 are each made in two lengths, the adjacent ends of each pair being spaced slightly and finished at an angle for cooperation with the vertical V iron 14 which vertical V iron 14 extends between the spaced angled ends of the horizontal V irons 13 and is secured thereto by means of short rods or other suitable pieces 15 (Figs. 14 and 15) arranged through aligned openings in the opposite sides of the V iron 14 and secured as by means of suitable bolts 16 to the V irons 13 at the apices thereof.

Guides made up in this particular instance of suitable angle irons 17 and 18 are secured to the wall 5 along the outer edges of the angle irons 10. These guides provide internal channels 19 for receiving guide rollers 20 and 21 secured to the lower corners of the closure section 7 by means of guide roller carrying brackets 22 mounted through hub portions 23 upon short rods or shafts 24 which extend through the upstanding vertical flanges 25 of the marginal angle irons 12, and are carried at their inner ends in the upstanding flanges 26 of suitable angle brackets 27 riveted or otherwise secured to the vertical flange 28 of the horizontally extending angle iron defining the lower edge of the closure section 7.

Guide rollers 30 and 31 (Figure 5) at the upper corners of the lower closure section 7 are arranged to run along flanges 32 and 33 respectively upon movement of the lower closure section 7 up into superimposed relation behind the upper section 8. The flanges 32 and 33 extend inwardly from vertical channels 34 secured along the opposite sides of the upper closure section 8. Cooperating angle irons 35 and 36 arranged along the opposite sides of the doorway 6 and extending vertically within the length of the upper closure section 8 maintain the proper positioning of such sections with respect to the wall 5 and form runways or guides along which the sections 7 and 8 are moved as a unit, as will be hereinafter more fully set forth.

The upper closure section 8 preferably comprises a corrugated panel 40, the opposite vertical edges of which are defined by the vertical channels 34 to which the edges of the panel are bolted or otherwise suitably secured. The upper edge of the panel 40 is defined by a horizontally extending angle iron 41 (Figure 5) to the vertical base flange of which the upper edge of the panel 40 is secured. Of course, as is the case with the lower closure section 7, the structural details of the upper section 8, as well as such other structural details as will be hereinafter set out, in connection with the particular closure shown are subject to modification within the scope of our invention. The detailed description of the particular closure shown is given so as to enable those skilled in the art to clearly understand a particular embodiment of our invention. The central area of the panel 40 is preferably open, as shown at 42—42 for the reception of a plurality of panes 43 arranged therein. The panes 43 are preferably of glass, although, of course, they may be made of other suitable transparent material or the upper closure section 8 might even be made up of a plurality of corrugated metal or other suitable sections as desired.

When used, the panes 43 are preferably secured in place by means of a plurality of angle iron strips 44 arranged vertically across the openings 42 and a plurality of angle iron pieces 45 arranged horizontally thereacross. These cooperating angle irons 44 and 45 divide each of the openings 42 up into a number of smaller openings, each of which is provided with a pane 43. Studs or ridges 46 as desired project into the spaces between the adjacent edges of the panes 43. Facing strips 47 are secured over the spaced edges of the panes 43 along the side opposite the side along which the angle iron pieces 44 and 45 extend.

As already set out, the closure sections 7 and 8 are supported and controlled in such manner that the lower section 7 is first moved upwardly from its closed position into superimposed position in front (Fig. 1) of the upper closure section 8 whereupon the sections 7 and 8 are swung as a unit away from the vertical to clear the door opening 6. In the particular embodiment shown, the lower closure section 7 is supported and the door is operated by means of a pair of cables 50, preferably fixed one at each of the opposite vertical edges of the closure section 7 as shown at 51 to a flange projecting from and extending along the lower edge of the section 7. Winding reels 52, which are preferably spiral grooved as shown to receive the cables and preferably of double conical formation for a purpose which will be hereinafter apparent, are mounted upon the opposite ends of a drum 55. Cables 50 extend up to and lie when the door is closed in the larger ends only of the spiral grooves in reels 52 and the opposite ends of said cables, chains or other flexible elements are secured at 53 to winding reels 52.

The drum 55 is mounted between a pair of bracket members 56 and 57 secured to the wall 5 above the opening 6 and projecting outwardly therefrom. A shaft 58 extending axially through the drum 55 is fixed against rotation as by means of a connection with one of the supporting bearings or in any other suitable or preferred manner. The opposite ends of the shaft 58 are carried by the bearing members 56 and 57. A coiled spring 60 fixedly secured at one end to a block or sleeve 61 secured upon the fixedly mounted shaft 58 is secured at its opposite end in a block 62 tending at all times to rotate the block 62 in a counterclockwise direction (Figure 10). The block 62 forms a head member to which one end of the hollow drum 55 is secured. The opposite end of the drum 55 embraces a block or head member 63. The head member 62 to which one end of the drum 55 is secured is rotatably mounted upon the fixed shaft 58. The head member 62 carries a gear 65 by means of which gear the head member and drum 55 are rotated to open and close the closure. The gear 65 is in the present instance secured to the head member 62 by means of a plurality of suitable pins or bolts 69 as shown in Figures 9 and 10.

For rotating the gear 65 and thereby the drum 55 a pinion 66 meshing with the gear 65 is mounted upon a relatively short shaft 67 journaled at one end in the bearing member 56 and at its opposite end in a bearing member 68 secured to the wall 5 and projecting therefrom. A gear 70 on the opposite end of the shaft 67 meshes with a pinion 71 mounted upon a relatively short shaft 72 one end of which is journaled in the bearing member 68 while the opposite end is journaled in a bearing member 75 secured to and projecting from the wall 5. A sprocket or chain wheel 76 on the shaft 72 is provided with a hand chain 77 extending down so as to be conveniently accessible to the operator at the foot of the door. It is through this hand or operating chain 77 that the head member 62 and drum 55 are rotated through the cooperating gears and pinions 71—70 and 66—65 to operate the door as will be set out presently. A housing 78 may be provided for the upper end of the operating chain 77 as shown, if so desired.

An arm or link 80 is arranged between each of the opposite vertical edges of the upper closure member 8 and the wall 5 as shown in Figure 2. The lower ends of the arms 80 are pivotally connected at 81 with bracket members 82 secured to the edges of the closure section 8 substantially intermediate the vertical length thereof. The opposite ends of the arms 80 are pivotally connected at 83 with bracket members 84 mounted upon and extending out from the wall 5 above the opening 6 therethrough.

When the door sections 7 and 8 are in their down or closed position and it is desired to raise them to open the door the operating chain 77 is grasped and the proper length thereof drawn downwardly to rotate the head member 62, drum 55 and pulleys 52 in a counterclockwise direction (Figure 10). Rotation of pulleys 52 with drum 62 turns the fixed end 53 of cables 50 about the axis of the drum in the direction of rotation thereof. This causes winding of cables 50 spirally about the spiral convolution in pulleys 52 with a resulting lifting of the ends of the cables extending down to the bottom of lower door section and a resulting upward movement or lifting or lower section 7 through the connections or attachment of cables 15 therewith at 51. In the upward movement of section 7 rollers 20 and 21 travel upwardly along angle iron guides 17 and 18 and rollers 30 and 31 travel upwardly along flanges 32 and 33 extending inwardly from vertical channels 34 secured along the opposite sides of upper closure section 8 and up into position between which channels the lower door section moves in opening. The tension of spring 60, which spring is placed under tension in the closing or downward movement of the door section, with the conical formations or gradually decreasing diameters of the spiral convolutions in pulleys 52 counterbalances the weight of lower door section 7 in any of the positions of said section so as to hold same in any position in which it is released.

The tension of spring 60 decreases as the drum is rotated to expand or unwind it with the raising of section 7 while the weight of section 7 remains the same throughout its upward movement alone. The decreasing radius of pulleys 52 provides a correspondingly decreasing leverage which decreases the load or force imparted by section 7 from the beginning to the end of its rectilineal movement alone. This permits proper counterbalancing of lower section 7 in any position by the decreasing counterbalancing effect of spring 60.

As lower section 7 reaches the upper limit of its rectilineal movement alone, hub portions 23 of the guide roller carrying brackets 22 at the bottom of lower section 7 engage the lower slotted ends 90 of channels 34 carried by upper section 8. Continued or further rotation of the operating pulleys in the direction in which they are rotated to raise the lower section rectilinearly, moves the lower section and upper section 8 as a unit upwardly, pivotal connections 81 at the lower ends of links 80 swinging outwardly about pivotal connections 83 and the upper ends of overlapping sections 7 and 8 swinging outwardly away from the vertical and finally into the position shown in dotted lines in Figure 2.

The spiral grooves in pulleys 52 are offset at 92 (Figs. 1 and 18) forming in effect a double conical convolution in each pulley. As lower section 7 reaches the upper limit of its vertical movement alone, cables or flexible elements 50 have wrapped spirally in the convolutions of pulleys 52 and reach the reduced off-set portions 92 of said convolutions. As the lower section picks up the upper section as well as in the initial movement of the two sections together, the weight is greatly increased and it is at this time that the cables wrap spirally in the reduced portions 92 which reduced portions greatly decrease the leverage through which the increased weight acts so that the load imparted by such weight will be properly counterbalanced by spring 60. As the two sections swing together toward open position, arms 80 take up a great part of the weight of the door, and as they do cables 50 wrap onto enlarged intermediate portions 100 of the spiral convolutions which increases the radius of leverage of the decreased weight so that it will be counterbalanced by spring 60. As the swinging of the two sections continues the tension of spring 60 continues to gradually decrease and an increased weight is gradually set up by the outward hanging position of the door. To decrease the radius of leverage through which the increasing weight of the door acts against the decreasing tension of the counterbalancing spring, so that the spring will counterbalance the two upper sections in all positions, the spiral convolutions in pulleys 52 are formed conical and of gradually decreasing diameter for the enlarged intermediate portion 100 to the opposite ends of the pulleys.

Suitable automatic safety lock mechanism shown diagrammatically in dotted lines at 95' in Figure 4 comprising bolts adapted to be forced outwardly into engagement with the guides along the door opening as by suitable springs in the event of a sudden dropping of the door sections as in the case of breaking of the cables 50 or the like to automatically stop the downward movement of the door may be provided if so desired.

While of course the spiral pulleys 52 may be formed as desired we have shown in Figures 18, 19 and 20 a method of forming these pulleys which we find exceedingly advantageous. A length of channel iron is first wound into a coiled formation as shown in Figures 19 and 20, the inner convolution of which coiled formation is then forced outwardly into the resulting spiral formation, as shown in Figure 18. The adjacent vertical flanges of the resulting spiral channel are then welded together at the point 96. The off-set portion for taking up the increased weight of the closure at the initial upward movement of the sections 7 and 8 as a unit is again shown at 92.

While we have described our invention in connection with the details of a particular embodiment, we do not intend thereby to limit the invention to such details as we are aware and contemplate that modifications and changes may be made without departing from the invention which is set out in the appended claims.

We claim:—

1. In a closure for covering a doorway, a closure section, a second closure section, means for moving said second section to superimposed relation with respect to said first section and for swinging said first and second sections away from the vertical together to uncover the doorway, spring means counterbalancing the second section in its movement into superimposed relation and the two sections in their swinging movement toward open position, said spring means imparting a decreasing counterbalancing action and means for decreasing the leverage of the door sections from the initial movement of the second section through the initial movement of both sections together, followed by an increased intermediate leverage and then a decreasing leverage to the end of the swinging movement of both sections together, so that the sections will be counterbalanced through their different positions by the decreasing counterbalancing action of said spring means.

2. In a closure for covering a doorway, an upper closure section, a lower closure section, means pivotally supporting the upper closure section, means for moving the lower section into superimposed relation with respect to the upper section and for swinging the two sections together toward open position about the pivotal support of the upper section, means for setting up a decreasing counterbalancing action to the movement of the closure sections, and means for decreasing the leverage of the lower section from the beginning to the end of its vertical movement alone, said means providing a decreased leverage at the initial opening movement of the two sections together, and as the weight of the sections is taken up by the pivotal supporting means an increased leverage decreasing as the sections swing together toward open position.

3. In a closure, a closure section, a second closure section, means for moving said second section into superimposed relation with respect to said first section and for swinging said first and second sections toward open position together, said means including a winding pulley and means for counterbalancing the closure through its different positions, the winding pulley having a spiral groove decreasing in diameter from one end to an enlarged intermediate diameter and decreasing in diameter from said enlarged intermediate diameter to the opposite end.

4. In a closure, a pair of closure sections, a winding drum, a winding pulley fixed on the drum for rotation therewith, a counterbalancing spring opposing rotation of the drum, said winding pulley having a spiral groove decreasing in diameter from one end to an enlarged intermediate diameter, and decreasing in diameter from said enlarged intermediate diameter to the opposite end.

5. In combination, an upper closure section, means pivotally supporting the upper closure section, a lower closure section adapted for movement into superimposed relation with respect to the upper section and for swinging movement with the upper section toward open position about the pivotal support, a winding drum for operating the sections, a counterbalancing spring opposing rotation of the drum, a winding pulley fixed on the drum for rotation therewith, a flexible winding element between the pulley and a lower closure section, the winding pulley having a spiral groove decreasing in diameter from one end to an enlarged intermediate portion and decreasing in diameter from said enlarged intermediate diameter to the opposite end.

6. In a closure, an upper closure section, means pivotally supporting same, a lower closure section movable into superimposed relation with respect to the upper section and having means adjacent its lower edge for engaging the upper section upon movement of the lower section into superimposed relation and swinging the upper section with it into open position about the pivotal support, a shaft supported horizontally above the closure, a winding drum surrounding said shaft, a counterbalancing spring connected between the shaft and drum, a winding pulley fixed on the drum, said pulley having a spiral convolution decreasing in diameter from one end to an enlarged intermediate portion and decreasing in diameter from the enlarged intermediate portion to the opposite end, a flexible winding element connected between the bottom of the lower closure section and the large diameter end of the winding pulley and adapted to wrap spirally in the spiral convolution thereof in turning the drum to open the closure, and means accessible from the bottom of the door for turning the winding drum.

7. In a closure, an upper closure section, means pivotally supporting same, a lower closure section movable into superimposed relation with respect to the upper section and having means adjacent its lower edge for engaging the upper section upon movement of the lower section into superimposed relation and swinging the upper section with it into open position about the pivotal support, a shaft supported horizontally above the closure, a winding drum surrounding the shaft, a gear fixed on the drum, means for driving said gear from the bottom of the closure to turn the drum, a counterbalancing spring arranged within the drum and connected between the shaft and drum, said spring imparting a decreasing counterbalancing action to the movement of the closure sections, a pair of winding pulleys fixed on the drum, each of said pulleys having a spiral convolution decreasing in diameter from one end to an enlarged intermediate portion and from the enlarged intermediate portion to the opposite end, flexible winding elements connected between the bottom of the lower closure section and the large diameter end of each winding pulley, said winding elements wrapping in the spiral convolutions of the pulleys from the large diameter ends to the reduced intermediate portions in the opening movement of the lower closure alone, in the reduced intermediate portion of the convolutions in the initial movement of both sections together and thereafter in the decreasing diameter portion of the convolution from the enlarged intermediate portions.

8. In combination, a door, and means including a spring and a pulley for raising and lowering the door, the said pulley having a spiral groove decreasing in diameter from one end to an enlarged intermediate diameter and decreasing in diameter to the said enlarged intermediate diameter to the opposite end, said spring being wound by the downward movement of the door and unwound by the raising of the door, the said pulley governing the leverage of the door.

9. A pulley having a spiral groove decreasing in diameter from one end to an enlarged intermediate diameter and decreasing in diameter from said enlarged intermediate diameter to the opposite end.

10. In combination, a closure section, a second closure section, means for moving said second section into superimposed relation with respect to said first section, and for swinging said first and second sections away from the vertical together, said means being operative through a decreasing lever arm until the lowest section is brought into superimposed relation with the upper section, and then through an increased lever arm on the initial outward swinging movement of both of said sections, the effective length of which decreases as both of said sections are raised.

11. In combination, a lower closure section, an upper closure section, means for moving said lower section into superimposed relation with respect to said upper section and for swinging said lower and upper sections away from the vertical together, said means including a winding pulley, said winding pulley being adapted to operate through a decreasing lever arm until the lower section is brought into superimposed relation with the upper section, and then through an increased lever arm on the initial outward swinging movement of both of said sections, the effective length of which decreases as both sections are raised.

12. In combination, a pair of closure sections, a winding drum, a winding pulley at each end of said drum and fixed for rotation therewith, said winding pulleys having spiral grooves decreasing in diameter from one end to an enlarged intermediate diameter, and then decreasing in diameter from said enlarged intermediate diameter to the opposite end.

13. A pulley having a spiral groove formed by winding a channel-shaped member about a central axis and then forcing one of the inner convolutions of said spiral outwardly and away from said central axis.

In witness whereof, we hereunto subscribe our names this 10th day of November, 1921.

EMIL FEIDT.
WILLIAM A. CROSS.
WAINWRIGHT B. GERVAIS.